United States Patent [19]
Stapleton

[11] Patent Number: 6,102,265
[45] Date of Patent: Aug. 15, 2000

[54] ARTICLE CARRIER ASSEMBLY FOR A VEHICLE ROOF

[75] Inventor: Craig A. Stapleton, Clarkston, Mich.

[73] Assignee: SportRack LLC, Sterling Heights, Mich.

[*] Notice: This patent is subject to a terminal disclaimer.

[21] Appl. No.: 09/025,280

[22] Filed: Feb. 18, 1998

[51] Int. Cl.⁷ .................................................. B60R 9/058
[52] U.S. Cl. ........................................... 224/321; 224/331
[58] Field of Search .................................. 224/319, 321, 224/322, 325, 329, 331, 330

[56] References Cited

U.S. PATENT DOCUMENTS

| | | | |
|---|---|---|---|
| 4,982,886 | 1/1991 | Cucheran | 224/321 |
| 5,335,836 | 8/1994 | Waddell | 224/329 |
| 5,577,650 | 11/1996 | Stapleton | 224/321 |
| 5,791,536 | 8/1998 | Stapleton | 224/321 |
| 5,845,829 | 12/1998 | Stapleton | 224/321 |

*Primary Examiner*—Renee Luebke
*Attorney, Agent, or Firm*—Rader, Fishman & Grauer PLLC

[57] ABSTRACT

An article carrier assembly for a vehicle roof includes a pair of side rails adapted for attachment to the vehicle roof, each side rail forming an inboard edge portion or a series of indexing holes. In one embodiment, a latch on a stanchion includes tie loops for securing articles on one assembly with rope. The latch lever includes a distal end portion engageable with the inboard edge portion or with the indexing holes for securing the stanchion with respect to the side rail. The latch lever is pivotally secured to a foot portion of the stanchion which includes spring portions compressible against the side rails to prevent rattles. In another embodiment, a hook portion of the latch compressibly engages a resilient side rail portion to create a clamping action to immobilize the stanchion on a trim rail and reduce rattles.

9 Claims, 13 Drawing Sheets

ARTICLE CARRIER ASSEMBLY FOR A VEHICLE ROOF

TECHNICAL FIELD

The present invention relates to an article carrier assembly for a vehicle roof, and more particularly to an article carrier assembly with improved noise damping and styling features.

BACKGROUND OF THE INVENTION

Automotive designers have reduced noise due to rattle in many design areas. However, automotive accessories such as roof mounted article carrier assemblies remain a potential source of rattle for vehicles. Such assemblies typically include a pair of side rails mounted to the roof with at least one cross rail extending therebetween. Stanchions on opposing ends of the cross rail attach the cross rail to the side rails. The stanchions are usually secured to the cross rails by clamps or other complex mechanisms. The mechanisms may include linkages that include clearance tolerances that may create rattles or squeaks during vehicle movement. When the clamps or complex mechanical connector components become worn and loosen with time, particular parts or the entire assembly may produce significant vehicle noise. The same noise problem exists for tie loop assemblies.

Another problem inherent with prior art article carrier assemblies is that it is difficult to combine trim styling with sufficient strength for supporting the article carrier assembly. In other words, the side rails are typically too bulky to give the appearance of a trim rail as a result of strength requirements, and attempts to design the side rails as trim rails are discouraged as a result of expected loss of article carrier structural integrity. It is difficult to provide cross rails in the form of a trim rail for styling purposes without sacrificing structural integrity.

DISCLOSURE OF THE INVENTION

The present invention overcomes the above-referenced short-comings of prior art article carrier assemblies by providing an article carrier assembly which includes compression members for resiliently engaging adjacent carrier components, preferably in coupling moveable stanchions to carrier side rails. The compression member may be formed as a spring arm extending outwardly from a body that resiliently engages an adjacent carrier component.

The spring arm may be formed as a portion of a latch lever having an interengagement with the side rail to lock the stanchion in a fixed position along the side rail. In a preferred embodiment, a latch lever preferably includes a hook spring portion extending from the bottom, the hook spring portion being compressible to hold the lever in the engaged or disengaged position, while simplifying the structure of the latch.

Another form of the compression member is formed at a retainer of the stanchion for resiliently engaging the retainer against an adjacent portion of the side rail. The side rail is preferably constructed in the form of a trim rail, and the compression members engage hidden openings in the trim rail.

Yet another form of the compression member is a resilient side rail portion which deflects when engaged by a hook portion of the lever to provide a clamping action.

In the preferred embodiment, the present invention comprises an article carrier assembly for a vehicle roof comprising at least one side rail adapted for attachment to the vehicle roof, the side rail having an inboard edge portion. A cross rail extends across the vehicle roof for carrying articles, the cross rail having opposing ends supported by stanchions. A stanchion is secured to each end of the cross rail. A latch includes a lever pivotally secured to the stanchion for movement between engaged and disengaged positions. The lever includes a distal end portion engageable with at least one opening in the inboard edge for indexing the stanchion in a longitudinal position with respect to the side rail. The lever includes a compression member that is resiliently engaged with the inboard edge portion in order to reduce rattle.

In another embodiment, the present invention provides an article carrier assembly comprising a pair of side rails adapted for attachment to the vehicle roof, the side rails having a plurality of indexing features, such as holes or an inboard edge. A cross rail extends across the vehicle roof supported by a stanchion secured to each end of the cross rail. A latch includes an indexing end for engagement with the indexing holes for securing the stanchion in desired positions along the side rail. The latch further includes a hook spring formed integrally with the latch adjacent the indexing end. The hook spring is compressible to force the indexing end against the side rail at the indexing holes for alleviating rattle.

In a further embodiment, the compression member is formed by a compressible attachment portion of the retainer. The compressible attachment portion resiliently engages the trim rail for alleviating rattles.

Yet another embodiment, the present invention provides a tie loop assembly for attachment to a vehicle panel. The assembly includes a foot slidably received within a side rail track, the foot having a plurality of molded-in spring tabs formed thereon for compressible engagement with the side rail to prevent rattles. A tie loop member is pivotally attached to the foot and has a loop aperture formed therethrough. The tie loop member further includes a hook portion selectively engageable with indexing apertures in the side rail for securing the tie loop member along the side rail.

Another embodiment, a foot comprises a first molded-in spring tab compressibly engageable with the tie loop member to prevent rattles, and a second molded-in spring tab compressibly engageable with the side rail to prevent rattles.

In a further embodiment, an article carrier assembly is provided having a foot portion slidably disposed within a side rail track, the foot portion having a plurality of molded-in spring tabs formed thereon for compressible engagement with the side rail to prevent rattles.

In yet another embodiment, an article carrier assembly is provided having a foot portion slidably disposed within a side rail track, the side rail having a resilient side rail portion that deflects when a hook portion of a latch lever engages therewith for providing a compressible engagement with the side rail to prevent rattles.

In yet another embodiment, an article carrier assembly is provided having a resilient side rail portion that deflects when a hook portion of a latch lever engages therewith for providing a compressible engagement with the side rail to prevent rattles.

Accordingly, an object of the present invention is to provide an adjustable or removable article carrier assembly for a vehicle roof with reduced rattle.

Another object of the present invention is to provide an article carrier assembly for a vehicle roof, with a resilient latch lever having a compression member resiliently engaging with a side rail for reducing rattle.

Yet another object of the present invention is to provide an article carrier assembly for a vehicle roof having a latch lever with a hook spring formed integrally therewith for forcing the lever against the trim rail for secure attachment.

Still another object of the present invention is to provide an article carrier assembly for a vehicle roof in which the side rail is in the form of a trim rail which opens inboard for receiving a resilient stanchion attachment lever.

Yet another object of the present invention is to provide an article carrier assembly having a latch with a simpler construction than previous latches to reduce rattle.

Still another object of the present invention is to provide an article carrier assembly including components with a compression member for resiliently engaging adjacent components to reduce rattle between carrier components.

Yet another object of the present invention is to provide an article carrier assembly having a retainer with an attachment portion which resiliently engages the trim rail for alleviating rattles.

A further object of the present invention is to provide a tie loop assembly with compression members between adjacent components to reduce rattle.

Still further object of the present invention is to provide a side rail with a resilient side rail portion that deflects when engaged with a hook portion of a latch lever to reduce rattle.

The above objects and other objects, features and advantages of the present invention are readily apparent from the following detailed description of the best modes for carrying out the invention when taken in connection with the accompanying drawings wherein like reference numerals refer to like components throughout the views shown.

DETAILED DESCRIPTION OF THE BEST MODES

Figure 1:
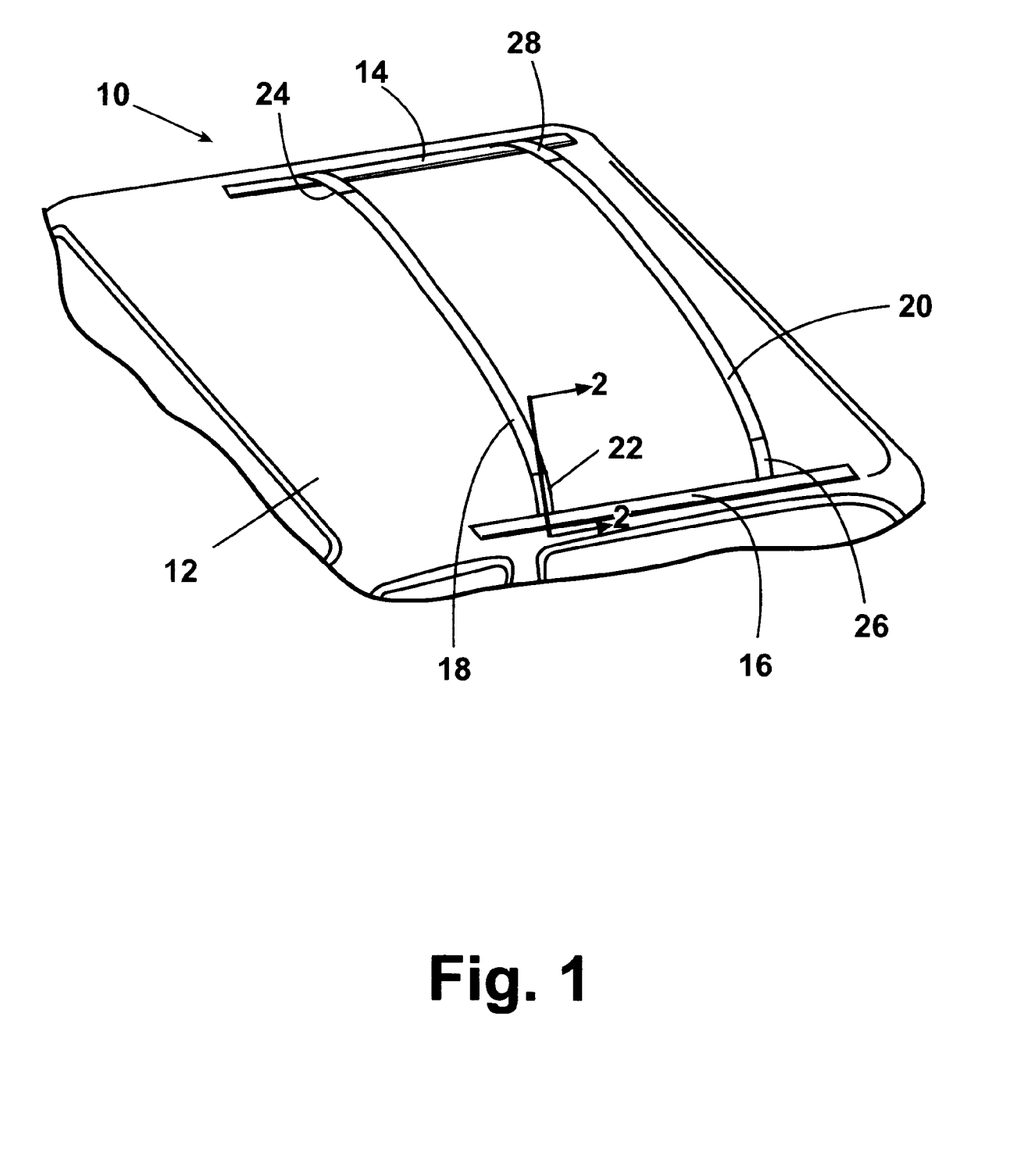
FIG. 1 shows a schematically arranged perspective view of an article carrier assembly secured to a vehicle roof in accordance with the present invention.

FIG. 1 shows a perspective view of an article carrier assembly 10 secured to a vehicle roof 12 in accordance with the present invention. Article carrier assembly 10 includes first and second side rails 14 and 16 attached to vehicle roof 12. First and second cross-rails 18 and 20 extend across the vehicle roof 12 for carrying articles thereon. The cross-rails 18 and 20 are secured to the side rails 14 and 16 by respective stanchions 22, 24, 26 and 28. Cross-rails 18 and 20 are preferably roll-formed metal, and stanchions 22, 24, 26, and 28 are injection molded glass-filled polyester.

Figure 2:
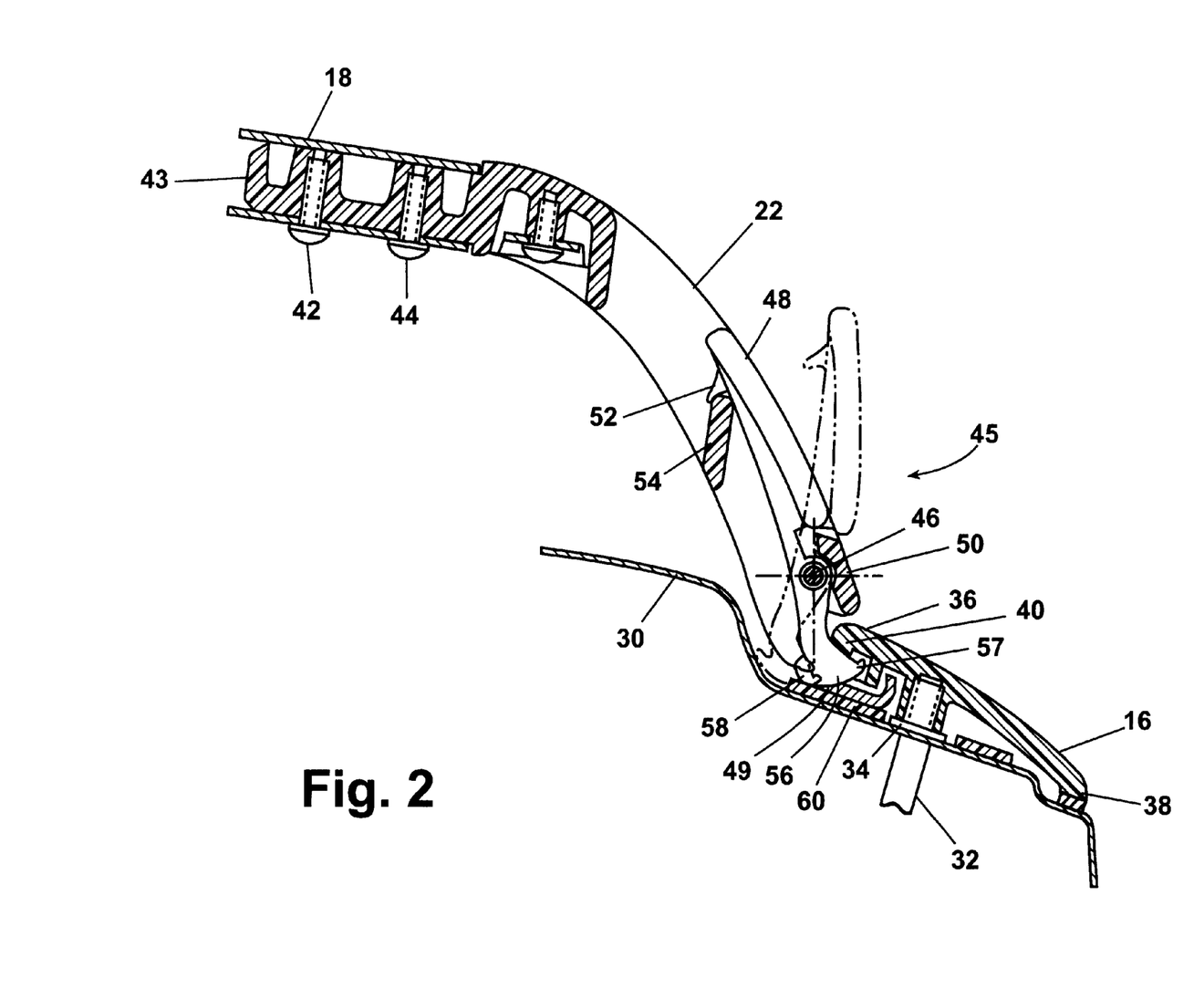
FIG. 2 shows a sectional view taken substantially along line 2—2 in FIG. 1 of a preferred embodiment of a stanchion and trim rail assembly in accordance with the present invention.
Figure 3:
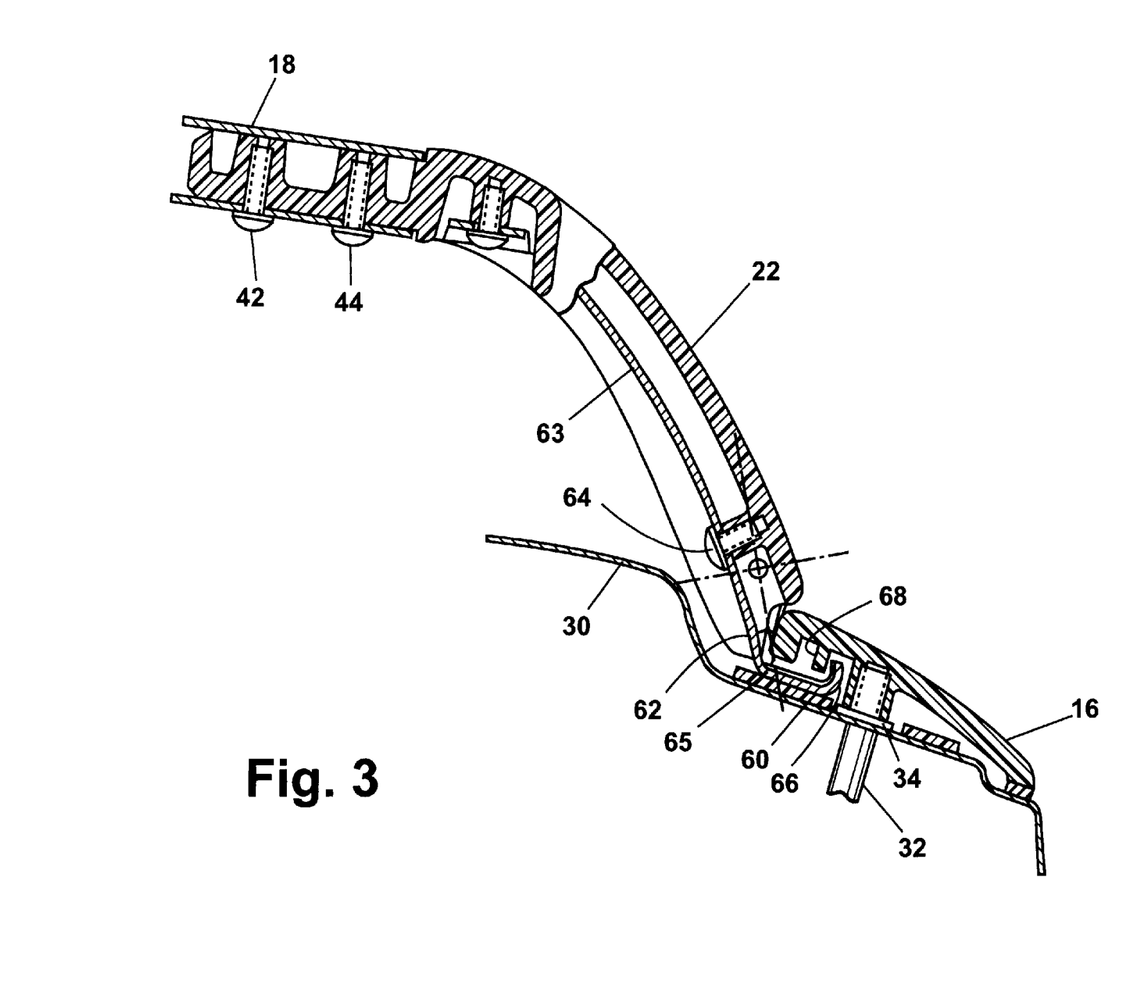
FIG. 3 shows a sectional view of the stanchion and trim rail assembly as shown in FIG. 2.

Turning to FIGS. 2 and 3, a preferred embodiment is show using stanchion 22 and side rail 16 as examples. FIG. 2 shows side rail 16 secured to roof panel 30 by a double-ended flanged stud 32 with a foam seal 34. Roof panel 30 is recessed to receive side rail 16 to give the appearance that the side rail 16 is actually a trim rail which follows the contour of the vehicle. Side rail 16 has an inboard side 36 and an outboard side 38, and forms an inboard edge portion 40 at inboard side 36. Inboard edge 36 includes at least one and preferably a plurality of index openings, such as detents, recesses, holes or the like that receive a latch protrusion to lock the stanchion at an index position along the side rail.

Stanchion 22 has a rail support 43 that is received in the end of cross-rail 18. Rail support 43 is secured to cross-rail 18 by self-tapping screws 42 and 44. This arrangement provides support strength for cross rail 18 to support articles placed thereon. A latch 45 extends and retracts a latch protrusion 56 which selectively engages side rail 16. In the preferred embodiment, latch protrusion 56 is formed as part of a latch lever 48 pivotally secured with respect to stanchion 22 by a press pin 46. A torsion spring 50 disposed around press pin 46 forces latch lever 48 from the disengaged position (shown in phantom) toward the engaged position in which protuberance 52 engages lock member 54 of stanchion 22.

For engagement, latch lever 48 includes a distal end portion 57 in the form of a hook which is engageable with inboard edge portion 40 of side rail 16. Latch lever 48 further includes a hook spring portion 58 extending therefrom adjacent distal end portion 57. Hook spring portion 58 extends in a direction opposite distal end portion 57 and is compressible to force distal end portion 57 against inboard edge portion 40 of side rail 16. Hook spring portion 58 is a resilient plastic tab formed integrally with latch lever 48. Since hook spring portion 58 is a plastic piece with memory, it has a compressible, resilient characteristic. Hook spring portion 58 is compressed by spacer 60 which creates a tension fit for eliminating possible rattles. Also, hook spring portion 58 provides cam surface engagement which forms an over-center feature which helps maintain lever 48 in the engaged position.

The over-center feature of hook spring portion 58 with respect to the press pin 46 further holds latch lever 48 in the disengaged position and forces distal end portion 57 of latch lever 48 against the inboard edge portion 40 of side rail 16. Once cam surface 49 of latch lever 48 bypasses the interference fit with spacer 60, cam surface 49 engages the corner of spacer 60. The interference fit of spacer 60 with cam surface 49 holds lever 48 in the disengaged position.

Referring to FIG. 3, a sectional view taken in a position spaced longitudinally along trim rail 16 from lever 48, a retainer 62 holds stanchion 22 in engagement with trim rail 16. Retainer 62 is preferably a metal stamping having an elongate portion 63 extending along stanchion 22 and is secured to stanchion 22 by attachment screw 64. Retainer 62 further includes a hook portion 65 which extends below trim rail 16, and an attachment portion 66 extending toward trim rail 16 from the end of hook portion 65. Attachment portion 66 extends beyond a rib 68 which protrudes from the underside of trim rail 16. Retainer 62, with attachment portion 66, prevents stanchion 22 from disengaging side rail 16. However, retainer 62 allows stanchion 22 to slide longitudinally along side rail 16 when lever 48 is disengaged.

Figure 4:
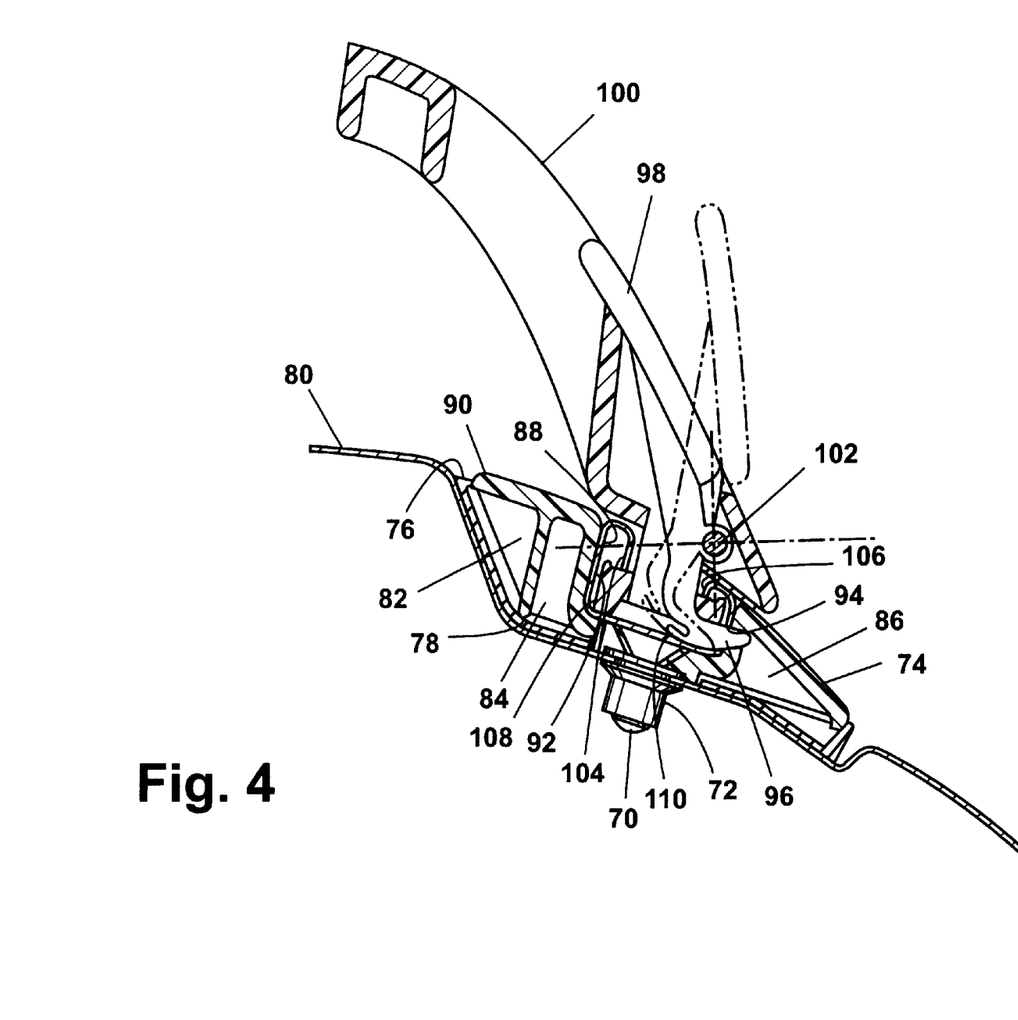
FIG. 4 shows a sectional view of a first modified embodiment of a stanchion and trim rail assembly in accordance with the present invention.

FIG. 4 shows a first modified embodiment of stanchion and trim rail assembly in accordance with the present invention. In this embodiment, trim rail 74 and gasket 76 are secured into recess 78 formed in roof panel 80 by a flat head screw 70 and rivet nut 72. Gasket 76 is preferably a plastic or rubber component. Trim rail 74 is injection molded and includes stiffener ribs 82,84 and 86. A slot 88 is formed intermediate upper surface 90 of trim rail 74. Slot 88 receives a roll-form insert 92 therein. Roll-formed insert 92 and trim rail 74 include a plurality of indexing holes 94 spaced longitudinally therealong. Indexing holes 94 are preferably dimensioned for receiving distal end portion 96 of latch lever 98. Latch lever 98 is pivotally attached to stanchion 100 by pivot pin 102.

Roll-formed insert 92 includes rolled portions 104 and 106 which engage T-portion 108 of stanchion 100 for preventing removal of stanchion 100 from roll-form insert 92 when latch lever 98 is in the disengaged position (shown in phantom) as stanchion 100 is adjusted longitudinally along trim rail 74. T-portion 108 of stanchion 100 allows stanchion 100 to slide along trim rail 74 while preventing removal of stanchion 100 by engaging rolled portions 104 and 106 of insert 92. Latch lever 98 also includes a hook spring portion 110 which is compressed to secure distal end portion 96 into indexing holes 94, thus holding latch lever 98 in the engaged position. Hook spring portion 110 also provides an over-center feature for securing lever 98 in the engaged position. The hook spring portion 110 and over-center feature operate very similarly to features described above with reference to FIG. 2.

Figure 5:
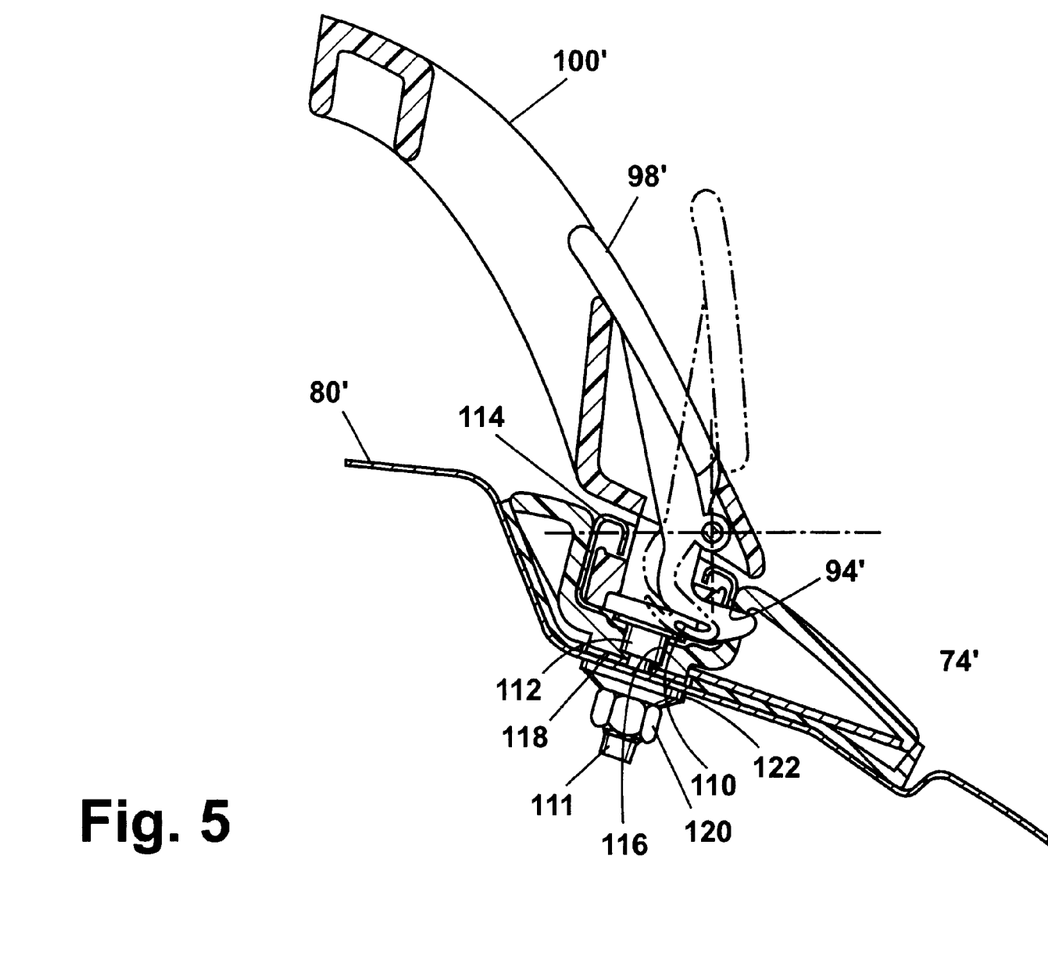
FIG. 5 shows a sectional view of a second modified embodiment of a stanchion and trim rail assembly in accordance with the present invention.

FIG. 5 shows a second modified embodiment of stanchion and trim rail assembly in accordance with the present invention. The embodiment shown in FIG. 5 includes latch lever 98, stanchion 100, and trim rail 74, as described above with reference to FIG. 4. This embodiment also includes hook spring portion 110 and indexing holes 94 as described with reference to FIG. 4. This embodiment differs from the FIG. 4 embodiment in its attachment mechanism. In this embodiment, a special press-fit stud 112 secures roll-form insert 114 to trim rail 74 by press-fitting into the aperture 116 through the trim rail 74. Stud 112 includes a dog point 111 to eliminate cross-threading. An adhesive seal 118 is provided for securing the bottom of trim rail 74 in the area around stud 112. A washer nut 120 is provided with a sealing gasket on the bottom of washer 122. Of course, a plurality of such attachment studs 112 are provided through a series of apertures 116 spaced longitudinally along the length of trim rail 74 for securing trim rail 74 to roof panel 80.

Figure 6:
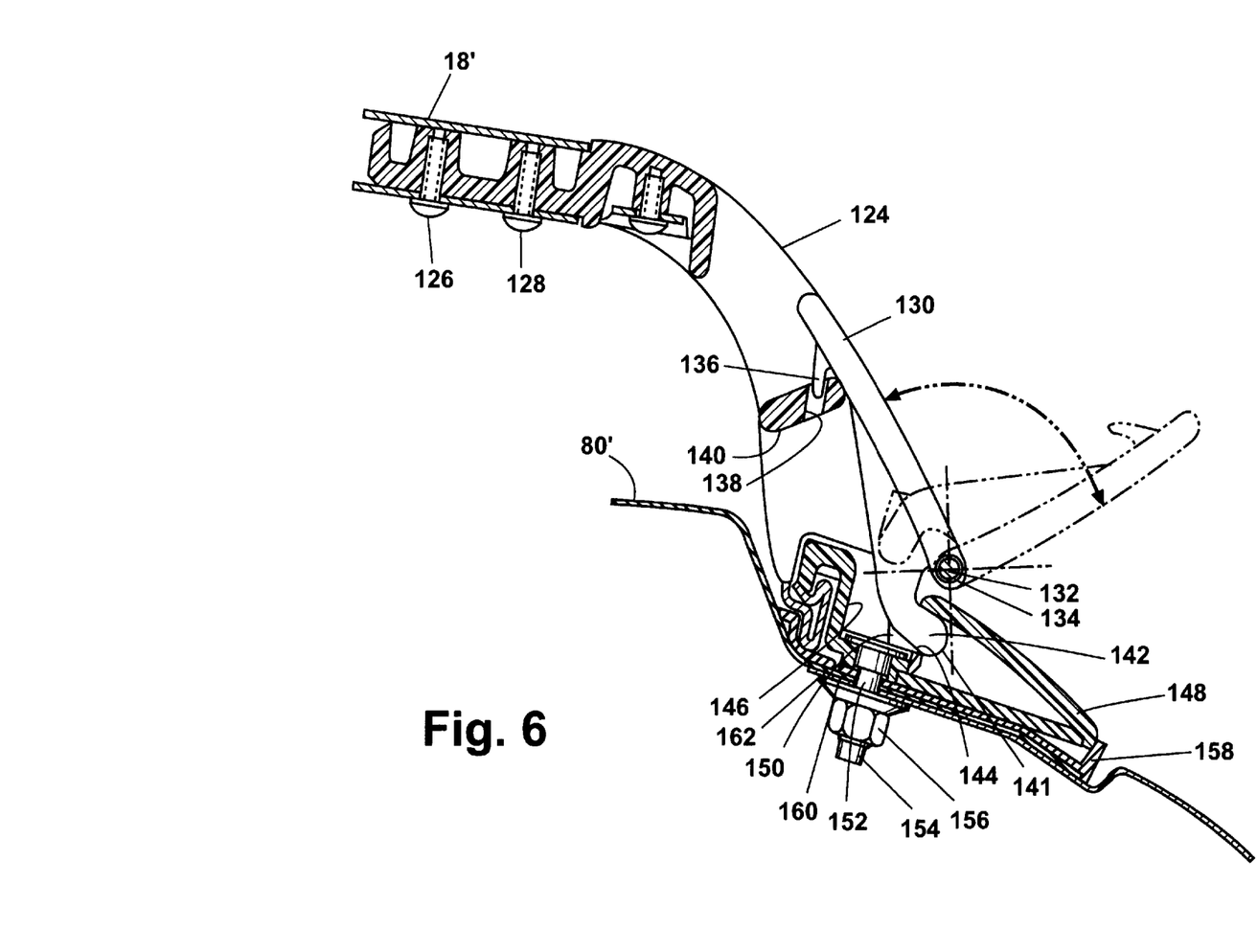
FIG. 6 shows a sectional view of a third modified embodiment of a stanchion and trim rail assembly in accordance with the present invention.
Figures 7, 8:
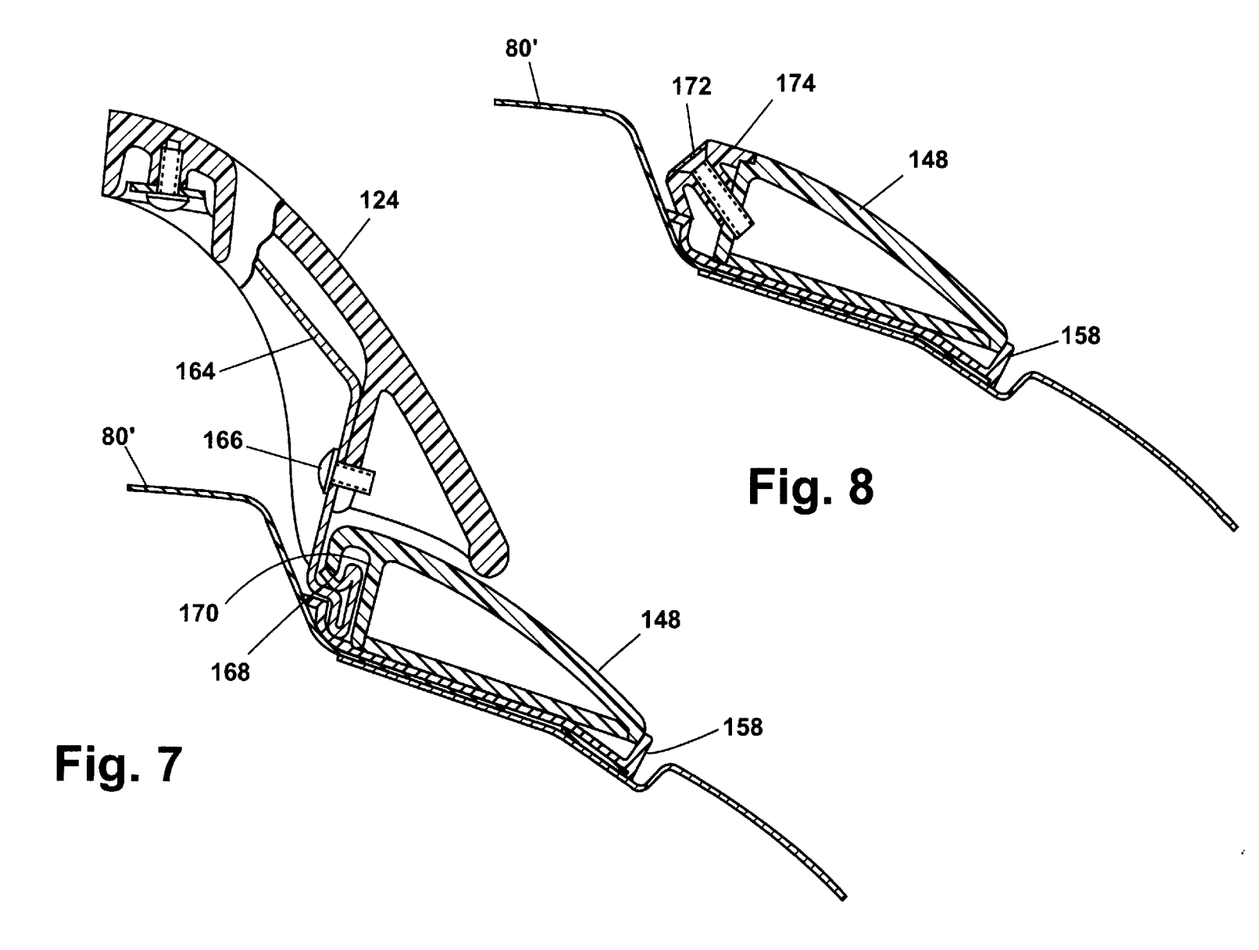
FIG. 7 shows a sectional view of the embodiment shown in FIG. 6.
FIG. 8 shows a sectional view of the trim rail in accordance with the embodiment shown in FIG. 6.

A third modified embodiment of the present invention is shown in FIGS. 6–8. Referring to FIG. 6, cross-rail 18 is secured to stanchion 124 by attachment screws 126 and 128. Stanchion 124 includes a latch lever 130 pivotally attached thereto by a pivot pin 132. A rotary spring 134 biases lever 130 from a disengaged position (shown in phantom) toward the engaged position. In the engaged position, protuberance 136 engages a slot 138 formed in lock member 140. Protuberance 136 acts as a further compression member for preventing rattles. Hook portion 142 of lever 130 engages trim rail indexing holes 144 which are spaced longitudinally along slot 146 formed in trim rail 148. Hook portion 142 includes a stand-off blade 150 to further secure lever 130 in the engaged position. Trim rail 148 is secured to roof panel 80 by a press-fit stud 152. The stud has a knob 154 to aid blind attachment of nut 156. A gasket 158 is secured between trim rail 148 and roof panel 80. A seal 160 is adhesively attached to the bottom of trim rail 148 around attachment stud 152. Washer nut 162 includes a sealing gasket on its bottom surface.

Hook portion 142 of lever 130 resiliently interferes with the bottom edge of indexing holes 144 when lever 130 is pivoted between the engaged and disengaged positions. Accordingly, distal end 141 of hook portion 142 acts as a cam surface which engages the lip of indexing holes 144, thus providing an over-center mechanism for securing hook portion 142 in the engaged position and discouraging re-engagement.

Referring to FIG. 7, stanchion 124 is secured to trim rail 148 by retainer 164 when lever 130 is in the disengaged position. Retainer 164 is secured to stanchion 124 by screw 166, and includes an attachment portion 168 extending below an inboard edge portion 170 of trim rail 148 for preventing removal of stanchion 124 from trim rail 148 when lever 130 is disengaged. Attachment portion 168 not only secures stanchion 124 for vertical lift loads, but also acts as a compression spring against inboard edge portion 170 to eliminate possible rattles. Alternatively, attachment portion 168 could be compressed against gasket 158 or trim rail 148. FIG. 8 shows a vertical cross-section of trim rail 148 of FIGS. 6 and 7 with a security screw 172 and cover 174 for securing gasket 158 to trim rail 148.

Figure 9:
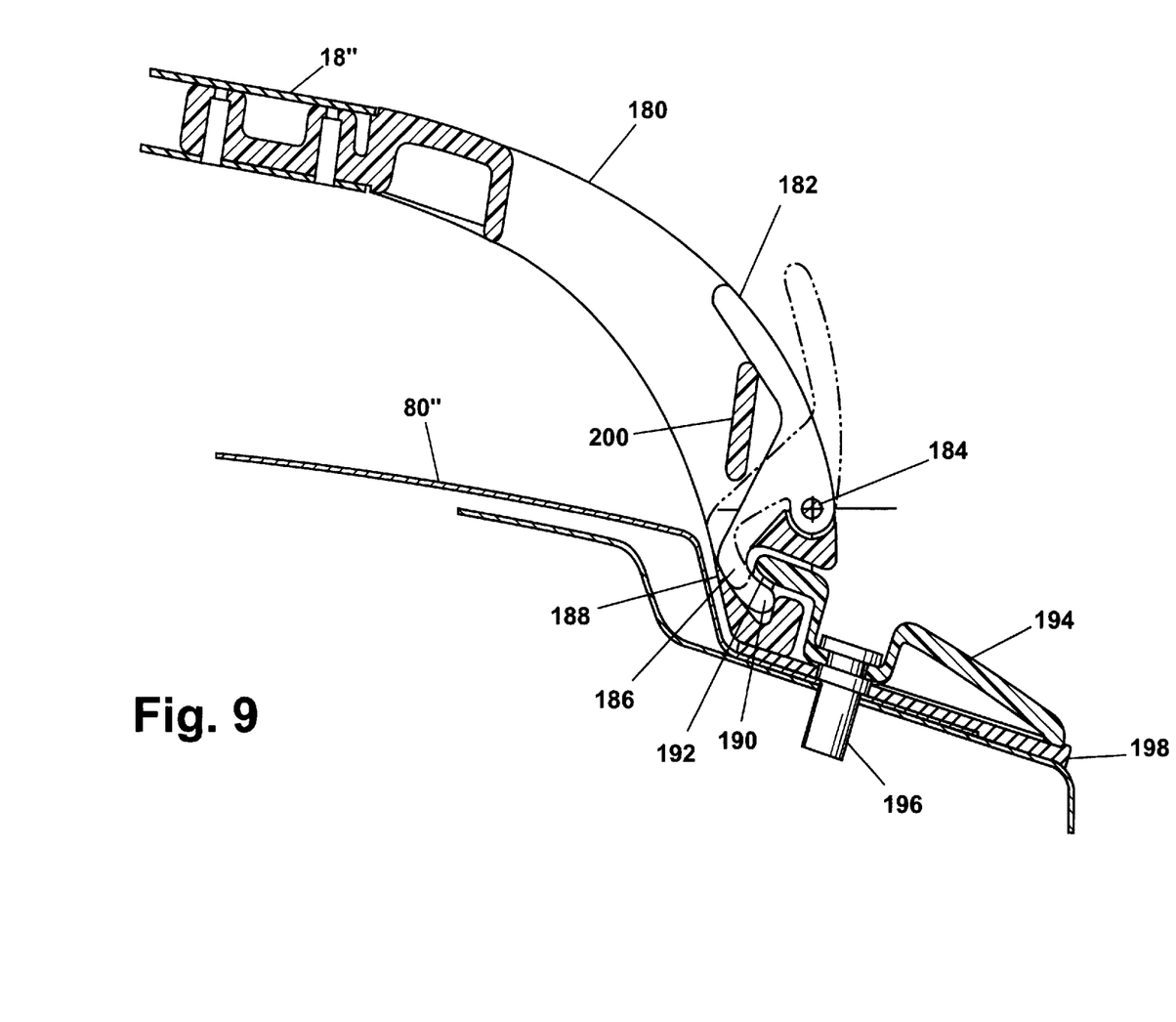
FIG. 9 shows a sectional view of a fourth modified embodiment of the stanchion and trim rail assembly in accordance with the present invention.

A fourth modified embodiment of the present invention is shown in FIG. 9. Cross-rail 18" is attached to stanchion 180. Latch lever 182 is attached to stanchion 180 by press pin 184. Latch lever 182 is held into both the engaged and disengaged positions because hook portion 186 of lever 182 has a resilient interference fit with lower portion 188 of stanchion 180 at both engaged and disengaged positions. Furthermore, distal end portion 190 of lever 182 has an interference fit with inboard portion 192 of trim rail 194 in order to snugly secure stanchion 180 to trim rail 194 to prevent rattles. A rivet nut 196 secures trim rail 194 and gasket 198 to roof panel 80. Pivotal movement of lever 182 is limited by opposing ends of stop 200. This design also includes a tie loop hole (not shown) through stanchion 180.

Figure 10:
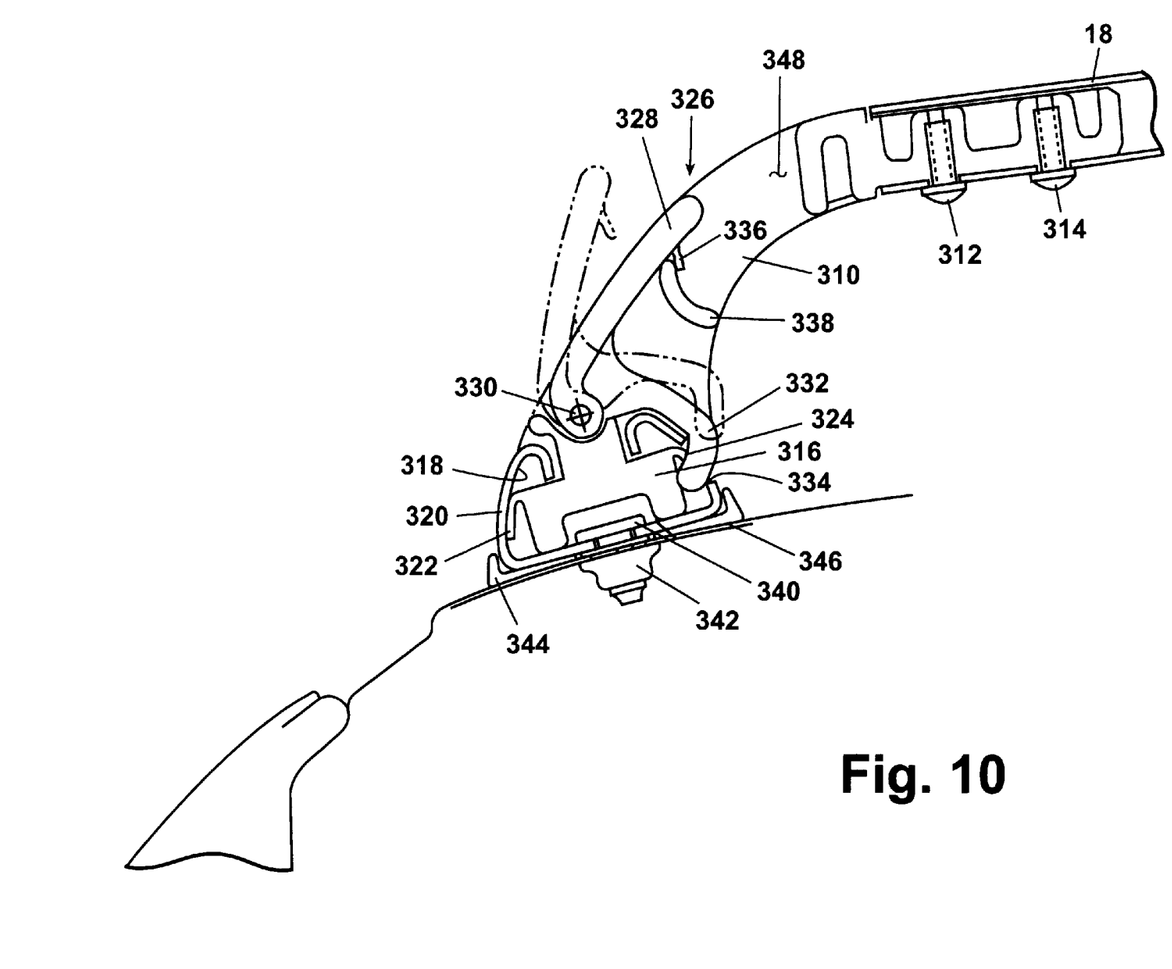
FIG. 10 shows a sectional view of a fifth modified embodiment of a stanchion and trim rail assembly in accordance with the present invention.

A fifth modified embodiment of the present invention is shown in FIG. 10. In this embodiment, a stanchion 310 is secured to cross rail 18 by screws 312 and 314, and includes a foot portion 316 slidably disposed within a track 318 in side rail 320. Foot portion 316 includes first and second molded-in spring tabs 322 and 324 formed thereon for compressible engagement with side rail 320 inside track 318 to prevent rattles.

Stanchion 310 further includes a latch 326 comprising a lever 328 pivotally secured to stanchion 310 by press pin 330. A torsion spring (not shown) pivotally biases lever 328 toward a position in which hook portion 332 of lever 328 is engaged with one of a plurality of indexing holes 334 formed along side rail 320. With hook portion 332 of lever 328 engaged with one of the plurality of longitudinally spaced indexing holes 334, stanchion 310 and cross rail 18 are secured from longitudinal movement along side rail 320. Lever 328 further includes a detent tab 336 which is engageable with a stop member 338 extending from stanchion 310 in order to secure the lever 328 in the engaged position.

In order to disengage lever 328, lever 328 is pivoted to disengage detent tab 336 from stop member 338, and further pivoted to withdraw hook portion 332 from indexing hole 334. In this disengaged position, as shown in phantom in FIG. 10, stanchion 310 and cross rail 18 may be moved longitudinally along side rail 320. Side rail 320 is preferably a roll-formed aluminum component. A screw 340 and rivet nut 342 secure side rail 320 and gasket 344 to vehicle roof panel 346.

Figure 11:
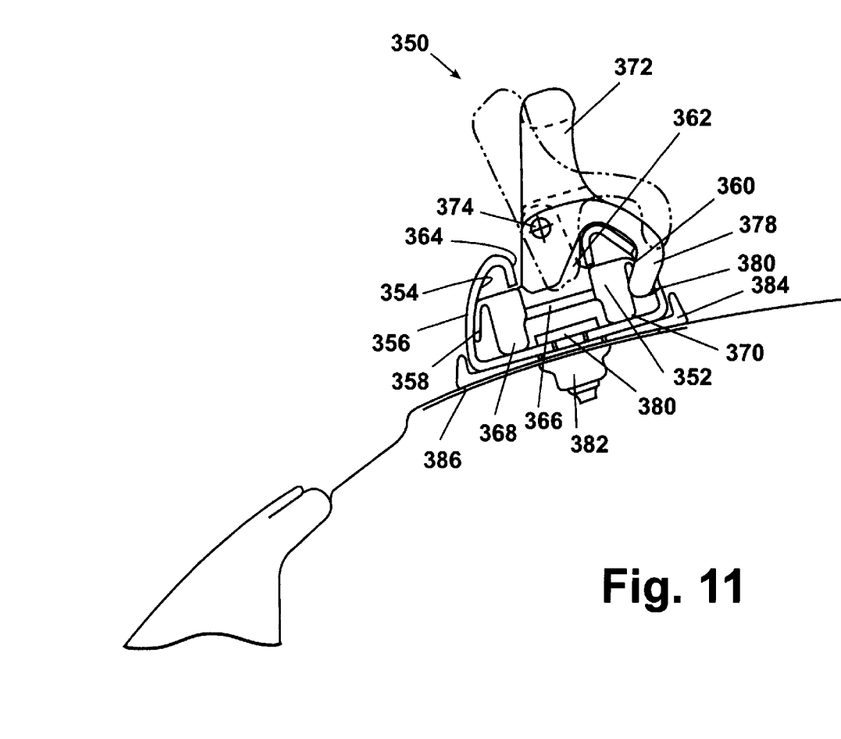
FIG. 11 shows a sectional view of a sixth modified embodiment including a tie loop assembly in accordance with the present invention.
Figure 12:
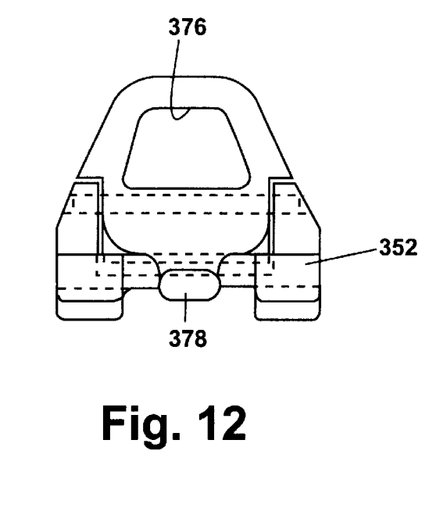
FIG. 12 shows a side view of the tie loop assembly shown in FIG. 11.

FIGS. 11 and 12 show a tie loop assembly 350 for use in accordance with a sixth embodiment of the present invention. Tie loop assembly 350 includes a foot 352 slidably received with track 354 of side rail 356. Foot 352 includes first and second molded-in spring tabs 358 and 360 formed thereon for compressible engagement with side rail 356 to prevent rattles. Foot 352 further comprises an upstanding portion 362 extending through an elongate opening 364 formed along track 354. A base 366 of foot 352 includes a pair of support legs 368 and 370. A tie loop member 372 is pivotally attached to foot 352 by press pin 374, and includes a loop aperture 376 formed therethrough. A hook portion 378 of tie loop member 372 is selectively engageable with indexing apertures 380 formed along side rail 356. With tie loop member 372 pivoted to the engaged position when hook portion 378 cooperates with indexing aperture 380, tie loop assembly 350 is secured from longitudinal movement along side rail 356. When tie loop member 372 is pivoted to the disengaged position, shown in phantom in FIG. 11, hook portion 378 of tie loop member 372 is disengaged from indexing aperture 380, and tie loop assembly 350 may be slid longitudinally along side rail 356. Again, a screw 380 and rivet nut 382 secure side rail 356 and gasket 384 to roof panel 386.

Figure 13:
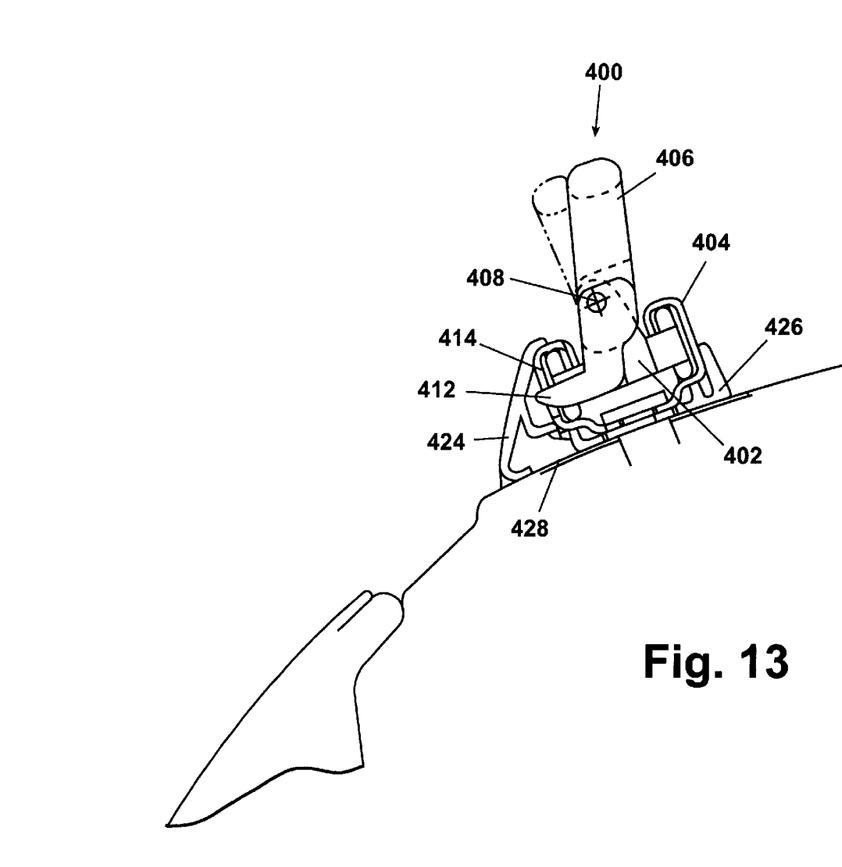
FIG. 13 shows a sectional view of a seventh modified embodiment including an alternative tie loop assembly in accordance with the present invention.
Figure 14:
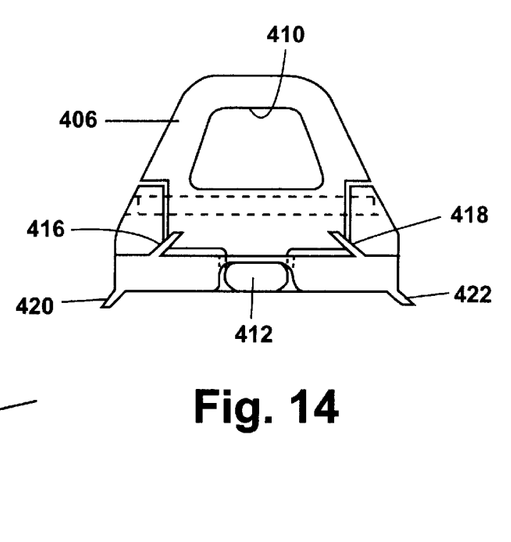
FIG. 14 shows a side view of the tie loop assembly shown in FIG. 13.

FIGS. 13 and 14 show an alternative tie loop assembly embodiment for use in accordance with a seventh embodiment of the present invention. Tie loop assembly 400 comprises a foot 402 slidably disposed within a side rail 404. Foot 402 includes a tie loop member 406 pivotally secured thereto by a press pin 408. Tie loop member 406 includes a loop portion 410 for receiving a rope or strap for securing articles to the vehicle roof. Tie loop member 406 further includes a hook portion 412 which is selectively engageable with a plurality of indexing apertures 414 formed along side rail 404. Tie loop member 406 is pivotable from the engaged position to the disengaged position, shown in phantom in FIG. 13, wherein hook portion 412 is disengaged from indexing apertures 414 to allow sliding longitudinal movement of tie loop 406 along side rail 404. Foot portion 402 includes a first set of molded-in spring tabs 416 and 418 extending therefrom for compressible engagement with tie loop member 406 in a manner to prevent rattles. Similarly, foot 402 includes a second set of molded-in spring tabs 420 and 422 extending therefrom for compressible engagement with side rail 404 to prevent rattles. The assembly 400 further includes a trim rail pad 424 secured to side rail 404, and a gasket 426 positioned between side rail 404 and vehicle roof panel 428.

Figure 15:
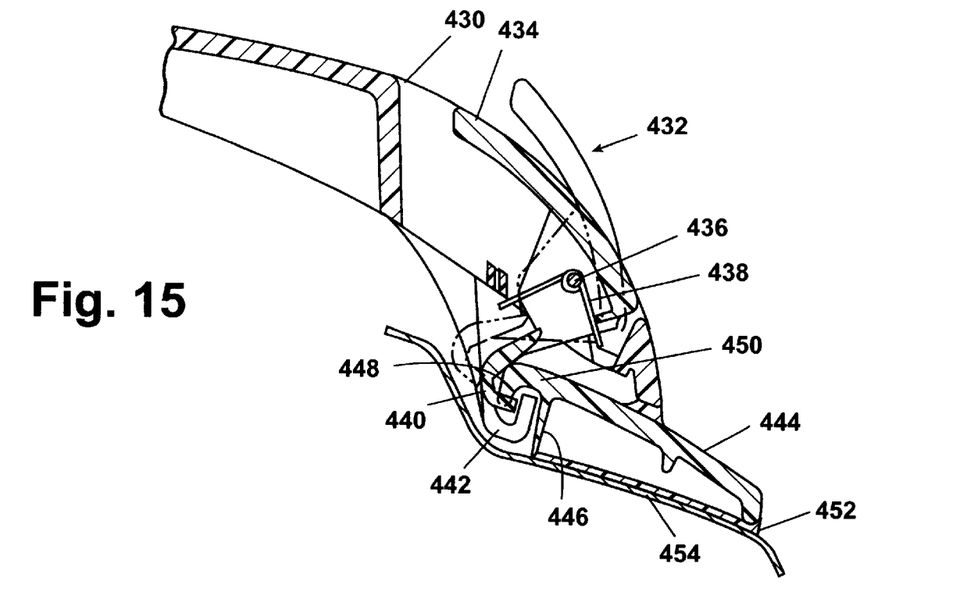
FIG. 15 shows a sectional view of an eighth modified embodiment of a stanchion and trim rail assembly in accordance with the present invention.

An eighth embodiment of a stanchion and trim rail assembly is shown in FIG. 15. As shown in FIG. 15, this embodiment includes stanchion 430 and trim rail 444. Trim rail 444 includes side rail wall 446 and side rail portion 448 to form side rail 450. Trim rail 444 further includes gasket portion 452 to facilitate connection to vehicle roof panel 454. Any of the attachment methods describe heretofore may be used to attach trim rail 444 to vehicle roof panel 454.

Stanchion 430 includes latch assembly 432 and foot portion 442 slidably disposed in side rail 450. Foot portion 442 prevents stanchion 430 from being removed from trim rail 444. Latch assembly 432 includes lever 434 pivotably connected to stanchion 430 by press pin 436. Torsion spring 438 pivotally biases lever 434 toward a position in which hook portion 442 of lever 434 is engaged to side rail portion 448.

Figures 16, 17:
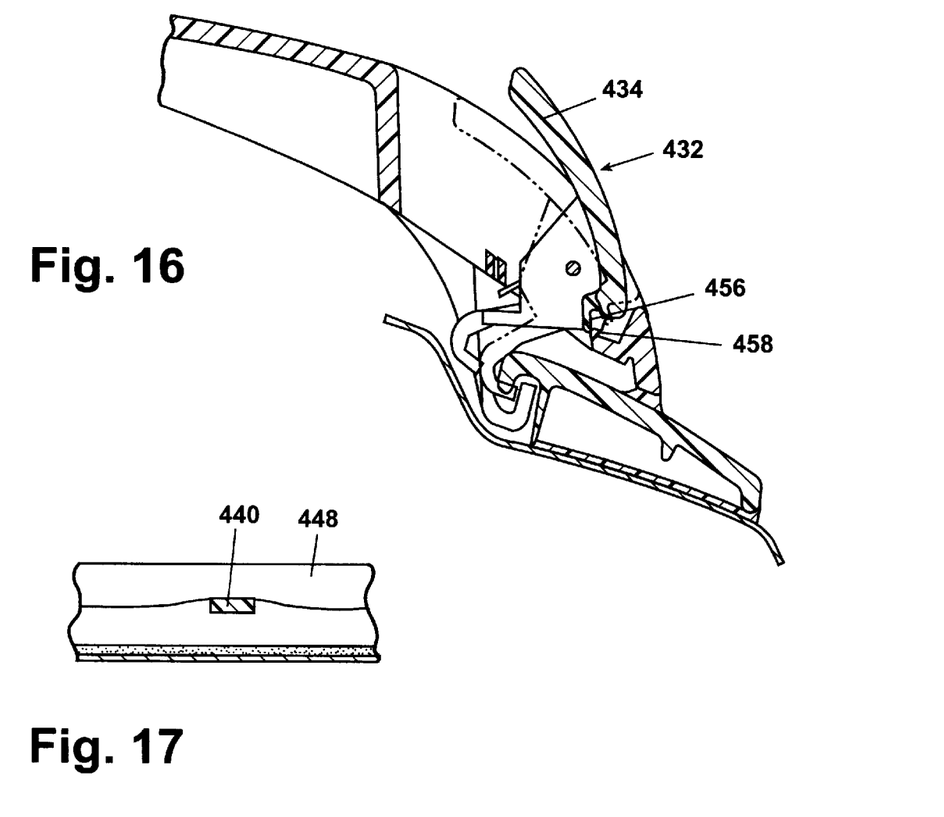
FIG. 16 shows an alternate sectional view of the embodiment shown in FIG. 15.
FIG. 17 shows an exaggerated view of the deflection of a side rail engaged with a hook portion.

As shown in FIG. 16, latch assembly 432 further includes detent tab 456 and stanchion 430 further includes stop member 458. When lever 434 is in a disengaged position as shown, detent tab 456 engages stop member 458 in order to maintain the disengaged position since torsion spring 438 biases lever 434 toward an engaged position. Maintaining the disengaged position facilitates foot portion 442 to slide along side rail 450 allowing easy positioning of stanchion 430 along side rail 450.

When lever 434 is in an engaged position, hook portion engages side rail portion 448 as shown in FIG. 15, or in phantom in FIG. 16. Side rail portion 448 is resilient in nature thereby deflecting when hook portion engages side rail portion 448 as shown in FIG. 17. The compression engagement of hook portion 440 to side rail portion 448 creates a clamping action which prevents stanchion 430 from moving along side rail 450 as well as reducing rattles.

Figure 18:
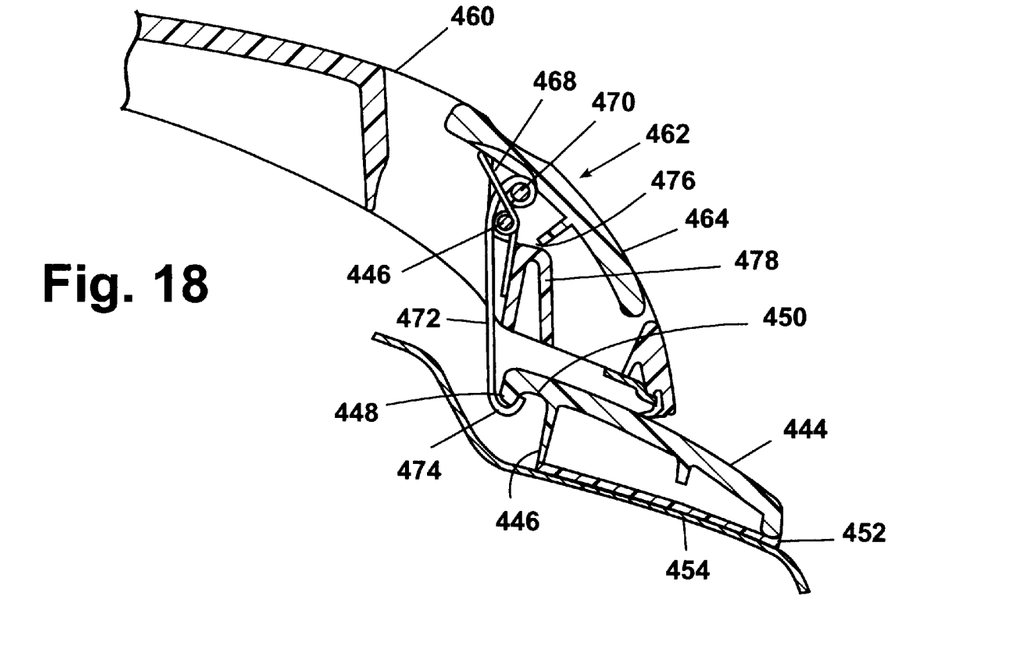
FIG. 18 shows a ninth embodiment of a stanchion and trim rail assembly wherein the stanchion is clampingly engaged to the trim rail.
Figure 19:
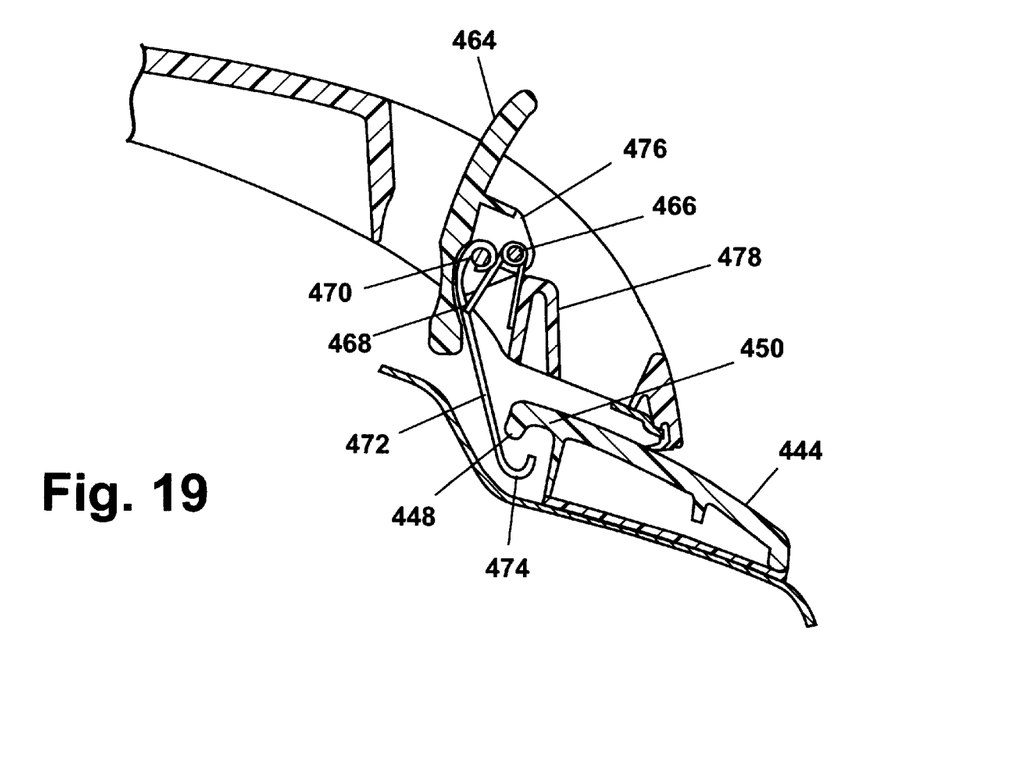
FIG. 19 shows the ninth embodiment of FIG. 18 wherein the stanchion is disengaged from the trim rail.

A ninth embodiment of the stanchion and trim rail assembly in accordance with the present invention is shown in FIGS. 18 and 19. In FIGS. 18 and 19, stanchion 460 is shown in combination with trim rail 444 used in the previous embodiment shown in FIGS. 15 and 16. Therefore, like components will be referred to using the same reference numbers as in FIGS. 15 and 16.

FIG. 18 shows a stanchion/trim rail assembly including stanchion 460 and trim rail 444 in the engaged position. Latch assembly 462 of stanchion 460 includes a lever 464 and a clamp 472. Lever 464 is pivotably attached to stanchion 460 by a press pin 466 and biased into an engaged position as shown by torsion spring 468. Lever 464 further includes detent member 476 which contacts stop member 478 of stanchion 460 to keep lever 464 in the engaged position.

Clamp 472 is pivotably attached to lever 464 by press pin 470. Clamp 472 further includes hook portion 474 which is slidably disposed in side rail 450 as shown in the disengaged position as shown in FIG. 19. When in the engaged position, hook portion 474 pulls up on resilient side rail portion 448 deflecting side rail portion 448 similar to the previous embodiment shown in FIG. 17 creating a clamping action.

In a disengaged position as shown in FIG. 19, lever 464 is pulled upwards allowing clamp 472 to pivot on press pin 470 to disengage hook portion 474 from side rail portion 448. In this position, hook portion 474 doubles as a foot portion slidably disposed in side rail 450 to allow longitudinal positioning of stanchion 460 along the length of trim rail 444.

While the best modes for carrying out the invention has been described in detail, those familiar with the art to which this invention relates will recognize various alternative designs and embodiments for practicing the invention without departing from the spirit and scope of the appended claims.

What is claimed is:

1. An article carrier assembly for a vehicle panel, comprising:
    at least one side rail adapted for attachment to the vehicle panel, said side rail further including a resilient side rail portion forming a track therein;
    a cross rail extending across the vehicle panel for carrying articles having opposing ends;
    a stanchion secured to one of said ends of said cross rail for securing the cross rail with respect to the side rail;
    a latch attached to said stanchion for compression engagement with said resilient side rail portion for securing a retainer along said at least one side rail; and
    a spring connected to said stanchion for biasing said latch toward an engaged position wherein said spring is a torsion spring.

2. The article carrier assembly of claim 1, wherein said latch comprises a lever pivotally attached to said stanchion and having a hook portion engageable with said resilient side rail portion.

3. The article carrier assembly of claim 2, wherein said resilient side rail portion deflects when engaged with said hook portion to provide a compression engagement.

4. The article carrier assembly of claim 2, further including a stop on said stanchion for engaging a detent member on said lever to limit lever rotation.

5. An article carrier assembly for a vehicle panel, comprising:
    at least one side rail adapted for attachment to the vehicle panel, said side rail further including a resilient side rail portion forming a track therein;
    a cross rail extending across the vehicle panel for carrying articles having opposing ends;
    a stanchion secured to one of said ends of said cross rail for securing the cross rail with respect to the side rail;
    a latch attached to said stanchion having a clamp for compression engagement with said resilient side rail portion for securing a retainer along said at least one side rail;
    a spring connected to said stanchion for biasing said latch toward an engaged position; and
    a stop on said stanchion for limiting rotation of said latch wherein said spring is a torsion spring.

6. The article carrier assembly of claim 5, wherein said clamp further includes a hook portion slidably disposed within said track engageable with said resilient side rail portion.

7. The article carrier assembly of claim 6, wherein said resilient side rail portion deflects when engaged with said hook portion to provide a compression engagement.

8. The article carrier assembly of claim 5, further including a detent member on said latch for engaging said stop to limit latch rotation toward the engaged position.

9. An article carrier assembly for a vehicle panel, comprising:
    at least one side rail adapted for attachment to the vehicle panel, said side rail further including a resilient side rail portion forming a track therein;
    a cross rail extending across the vehicle panel for carrying articles having opposing ends;
    a stanchion secured to one of said ends of said cross rail for securing the cross rail with respect to the side rail;
    a lever pivotally attached to said stanchion and having a hook portion engageable with said resilient side rail portion for securing a retainer along said at least one side rail;
    a torsion spring connected to said stanchion for biasing said lever toward an engaged position;
    a stop located on said stanchion for engaging a detent member on said lever to limit lever rotation toward the engaged position.

* * * * *